United States Patent
Pope et al.

(10) Patent No.: US 10,409,655 B2
(45) Date of Patent: *Sep. 10, 2019

(54) ORDERED EVENT NOTIFICATION

(71) Applicant: Solarflare Communications, Inc., Irvine, CA (US)

(72) Inventors: Steven Leslie Pope, Cambridge (GB); David James Riddoch, Cambridge (GB); Kieran Mansley, Cambridge (GB); Sian Cathryn James, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/667,329

(22) Filed: Aug. 2, 2017

(65) Prior Publication Data

US 2017/0329656 A1 Nov. 16, 2017

Related U.S. Application Data

(63) Continuation of application No. 14/231,558, filed on Mar. 31, 2014, now Pat. No. 9,778,963.

(51) Int. Cl.
*H04L 7/00* (2006.01)
*G06F 9/54* (2006.01)
(Continued)

(52) U.S. Cl.
CPC ............. *G06F 9/542* (2013.01); *G06F 9/547* (2013.01); *H04L 69/162* (2013.01); *H04L 69/28* (2013.01); *H04L 49/90* (2013.01)

(58) Field of Classification Search
CPC ....... G06F 9/542; G06F 9/547; H04L 69/162; H04L 69/28; H04L 49/90
See application file for complete search history.

(56) References Cited

U.S. PATENT DOCUMENTS 7,051,337 B2 * 5/2006 Srikantan ................ G06F 9/542
 709/227
7,991,909 B1 8/2011 Schumacher et al.
(Continued)

FOREIGN PATENT DOCUMENTS

WO WO 2004/025477 A2 3/2004
WO WO-2007138250 A2 * 12/2007 ............. G06F 9/526

OTHER PUBLICATIONS

S Pope, et al., Introduction to OpenOnload—Building Application Transparency and Protocol Conformance into Application Acceleration Middleware, copyright.COPYRGT. 2011 Solarflare Communications, Inc., 8 pages.
(Continued)

*Primary Examiner* — Andy Ho
*Assistant Examiner* — Abdou K Seye
(74) *Attorney, Agent, or Firm* — Wolf, Greenfield & Sacks, P.C.

(57) ABSTRACT

A method and data processing system are provided. The data processing system comprises an application associated with a plurality of sockets and a sub-system for making data available to the application via the plurality of sockets. The sub-system is configured to provide in response to a request from the application: an indication of events that have occurred on one or more of the plurality of sockets; and an indication of an order in which the events should be processed.

27 Claims, 4 Drawing Sheets

(51) Int. Cl.
    *H04L 29/06*     (2006.01)
    *H04L 12/861*     (2013.01)

(56)              References Cited

U.S. PATENT DOCUMENTS

| | | |
|---|---|---|
| 9,778,963 B2 | 10/2017 | Pope et al. |
| 2002/0042839 A1 | 4/2002 | Peiffer et al. |
| 2003/0014544 A1 | 1/2003 | Pettey |
| 2008/0209402 A1* | 8/2008 | Parkinson ........... G06F 11/3495 717/124 |
| 2008/0232364 A1 | 9/2008 | Beverly |
| 2009/0172014 A1* | 7/2009 | Huetter ............. G06F 17/30551 |
| 2010/0057932 A1 | 3/2010 | Pope et al. |
| 2011/0029734 A1 | 2/2011 | Pope et al. |
| 2012/0254893 A1 | 10/2012 | Pope et al. |
| 2014/0006610 A1 | 1/2014 | Formby et al. |
| 2015/0277997 A1 | 10/2015 | Pope et al. |

OTHER PUBLICATIONS

Banga, et al., A Scalable and Explicit Event Delivery Mechanism for Unix, Proceedings of the USENIX Annual Technical Conference, Jun. 6-11, 1999, 14 pages.

* cited by examiner

ORDERED EVENT NOTIFICATION

CROSS-REFERENCE TO RELATED APPLICATIONS

This application claims priority under 35 U.S.C. § 120 as a continuation application to U.S. patent application Ser. No. 14/231,558, titled, "Ordered Event Notification," filed on Mar. 31, 2014, the entirety of which is incorporated herein by reference.

FIELD OF THE INVENTION

The present application relates to the processing order of data and in particular but not exclusively to the processing order of network packets by an application.

BACKGROUND OF THE INVENTION

When data is to be transferred between two devices over a data channel, each of the devices must have a suitable network interface to allow it to communicate across the channel. The devices and their network interfaces use a protocol to form the data that is transmitted over the channel, so that it can be decoded by a receiver. The data channel may be considered to form part of a network, and additional devices may be connected to the network.

Data may be received at a device on a network at a network interface. The network interface is capable of supporting the physical and logic requirements of the network protocol, for example Ethernet. The physical hardware components of the network interfaces are referred to network interface cards (NICs) although they need not be in the form of cards. For example, they could be in the form of integrated circuits (ICs) and connectors fitted directly onto a motherboard.

The communication of an application of a device over a network may be facilitated through the use of sockets. A socket may form an end-point for a communication over a network. The management of the sockets, for example determining whether a socket is ready to be processed by an application, may be carried out by the application making system calls to the operating system of the device. The system call may indicate a file descriptor associated with a socket.

System calls to determine whether one or more sockets are ready for processing may return an indication of the sockets that can be processed. The present application aims to allow an application to ascertain an order in which the sockets should be processed in addition to which sockets are ready to be processed.

SUMMARY

According to a first aspect, there is provided a data processing system comprising: an application associated with a plurality of sockets; and a sub-system for making data available to the application via the plurality of sockets; the sub-system configured to provide in response to a request from the application: an indication of events that have occurred on one or more of the plurality of sockets; and an indication of an order in which the events should be processed.

The sub-system may be an interface between the application and a network. The sub-system may be further configured to receive the data from the network. The indicated events may be each associated with one of the plurality of sockets and the order in which the events should be processed corresponds to an order in which the one or more of the plurality of sockets should be processed.

Each of the plurality of sockets may be associated with a respective queue for queuing data received for said socket. An event may occur when a data segment is queued for a socket. The indication of an order in which the events should be processed may comprise for each socket associated with a respective event: a number of bytes associated with the respective event; and a timestamp associated with the number of bytes. The number of bytes associated with the respective event may correspond to a data segment queued on a socket. The timestamp of each socket may indicate an order in which the sockets are to be processed.

The order in which the sockets are to be processed may correspond to an order in which the data segments queued on respective sockets became readable. The order in which the sockets are to be processed may correspond to an order in which the data segments were received at a physical network interface of the data processing system. Data segments addressed to a socket may form part of a data stream for that socket.

The data segments of a data stream may be considered to be readable when they are received in a sequential order of the data stream. The application may be configured to identify to the sub-system the one or more of the plurality of sockets.

The data system may further comprise an event monitor configured to monitor the receipt of data segments for the identified sockets. The event monitor may be configured to determine a timestamp to be associated with a data segment received for a socket. The data processing system may further comprise a physical network interface.

The physical hardware interface may be configured to hardware time stamp a data segment received for a socket before providing the hardware time stamp and the data segment to the sub-system. The sub-system may be further configured to determine a time stamp to be associated with the received data segment in dependence on the hardware time stamp. The sub-system may be further configured to when no data segments for other sockets are received between the receipt of a first data segment for a first socket and a second data segment for the first socket: coalesce the first and second data segments for the first socket.

The coalesced segments may correspond to a single event. The sub-system may be further configured to coalesce at least two data segments received for a socket when the hardware time stamps of the at least two data segments are sequential. The sub-system may be further configured to determine a time stamp for the coalesced data segment to correspond to a time stamp of the first data segment.

The sub-system may be further configured to determine a time stamp for a data segment when said data segment is received in a sequential order of a data stream to which the segment belongs. The sub-system may be further configured to retain data segments that have been received out of order. A retained data segment may be considered to be received in order when the intervening sequential segments of the data stream have been received The sub-system may be further configured to coalesce the retained data segment with received intervening sequential segments of the data stream and determine a time stamp for the coalesced segment where the determined time stamp corresponds to a time at which the retained segment is considered to be received in order.

The data processing system may further comprise: a plurality of notification queues configured to store a notification that a data segment has been received by a physical network interface; wherein the sub-system is further configured to poll the notification queues associated with the one or more plurality of sockets in response to the request from the application. The queues may be polled sequentially.

The sub-system may be further configured to compare a hardware timestamp of the segment associated with a last notification in each notification queue and only segments having a time stamp equal to or earlier than the earliest of the compared time stamps are queued at the one or more sockets. The request from the application may be a system call. The response to the request may comprise a system call response.

The data processing system may further comprise an application programming interface configured to support the sockets and one or more system calls. The system call may be an epoll call. The epoll call may be an epoll_wait( )call. The system call may be an application programming interface library call. The system call may be an intercepted system call.

In response to the request by the application, the application programming interface may construct a data structure comprising for each requested socket, a number of bytes field and a timestamp field. The sub-system may be configured to complete the number of bytes field and timestamp field for the identified sockets which are ready to be processed. The request from the application may comprise an indication of a period of time for the sockets are to be monitored and a maximum number of events that may be returned in the response. The events monitor may be further configured to provide an I/O notification to the application when the relevant fields have been completed.

The one or more sockets may be associated with at least one of a process of the application and a thread of the application. Each of the one or more sockets may be identified by a file descriptor. The request from the application may comprise one or more file descriptors identifying the sockets for which events are requested to be monitored.

The sub-system may comprise a file descriptor table storing a correspondence between a file descriptor and a socket. The data processing system may be a financial server and the data corresponds to trade requests at a financial exchange.

According to a second aspect, there is provided, an interface for supporting a plurality of sockets and a system call, the interface configured to: received a request for monitoring events on one or more identified sockets from an application; provide a data structure accessible to a sub-system comprising an events field for indication that an event has occurred on an identified socket and an order field for an indication of an order in which the indicated sockets are to be processed; and provide the request and indication of the data structure to the sub-system.

The order field may comprise a number of bytes field for an indication of a number of bytes to be processed for a socket and a time-stamp field. The interface may be an application programming interface. The application programming interface may be a user-level library.

According to a third aspect, there is provided a method comprising: receiving a request from an application associated with a plurality of sockets; and providing in response to the request an indication of which sockets of the plurality of sockets are associated with a respective event and an indication of an order in which the indicated sockets should be processed.

The method may further comprise making data available to the application via the plurality of sockets. The method may further comprise receiving the data from the network. The method may further comprise determining that a socket is associated with an event when at least one of: said socket is ready to be processed by the application; and data addressed to that socket is received by the sub-system;

Providing an indication of an order in which the indicated sockets should be processed may further comprise providing an indication of a number of bytes associated with the respective event and a timestamp associated with the number of bytes. The method may further comprise queuing data segments addressed to a socket at the socket and providing a number of bytes corresponding the number of bytes in a data segment queued at that socket.

The method may further comprise determining an order in which to process the indicated sockets and generating the timestamps corresponding to the determined order. The method may further comprise receiving an indication from the application identifying the plurality of sockets. The method may further comprise monitoring the receipt of data segments for the identified sockets.

The method may further comprise determining a timestamp to be associated with a data segment received for a socket. The method may further comprise hardware time stamping a data segment received for a socket before providing the hardware time stamp and the data segment to the sub-system. The method may further comprise determining a time stamp to be associated with the received data segment in dependence on the hardware time stamp.

The method may further comprise when no data segments for other sockets are received between the receipt of a first data segment for a first socket and a second data segment for the first socket, coalescing the first and second data segments for the first socket. The method may further comprise coalescing a first and a second data segment received for a socket when the hardware time stamp of the first data segment and the hardware time stamp of the second data segment is sequential. The method may further comprise determining a time stamp for the coalesced data segment to correspond to a time stamp of the first data segment.

The method may further comprise determining a time stamp for a data segment when said data segment is received in a sequential order of a data stream to which the segment belongs. The method may further comprise retaining data segments of a data stream addressed to a socket that have been received out of order for that data stream. The method may further comprise receiving the intervening sequential data segments of the data stream and determining that the retained data segment has been received in order when all the intervening data segments have been received.

The method may further comprise coalescing the retained data segment with the received intervening sequential segments of the data stream and determining a time stamp for the coalesced segment to be a time at which the retained segment is considered to be received in order. The method may further comprise polling the queues of the identified sockets in response to the request from the application. Polling the queues may further comprise polling the queues sequentially.

The method may further comprise comparing a hardware timestamp of the last segment in each queue and only segments having a time stamp equal to or earlier than the earliest of the compared time stamps are provided in the indications. The method may further comprise in response to the request by the application, constructing by an application program interface a data structure comprising for each requested socket, a number of bytes field and a timestamp field.

The method may further comprise a sub-system completing the number of bytes field and timestamp field for the identified sockets which are ready to be processed. The method may further comprise providing a notification to the application when the relevant fields have been completed.

According to a fourth aspect, there is provided a method comprising: supporting a plurality of sockets and a system call; receiving a request from an application for monitoring events on one or more identified sockets of the plurality of sockets; and in response to the request: providing a data structure accessible to a sub-system comprising an events field for indication that an event has occurred on an identified socket and an order field for an indication of an order in which the indicated sockets are to be processed; and providing the request and indication of the data structure to the sub-system.

BRIEF DESCRIPTION OF THE DRAWINGS

The teachings of embodiments of the present application will be described with reference to the following figures in which.

DETAILED DESCRIPTION

Figure 1:
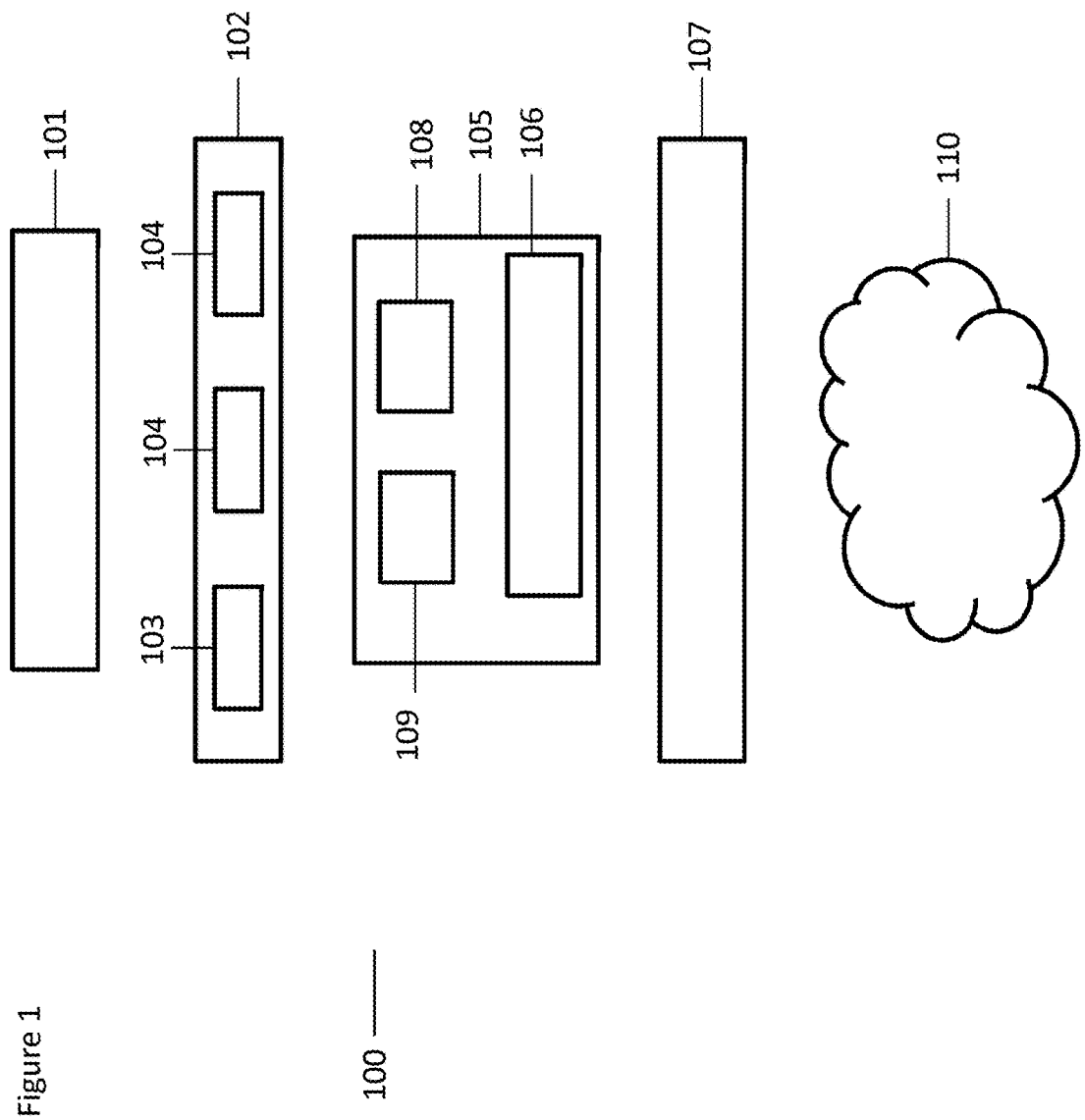
FIG. 1 is an example of a data processing system in which embodiments may be implemented.

FIG. 1 shows an example of a data processing system 100 in which embodiments of the present application may be implemented.

The data processing system of FIG. 1 may be any data processing system 100 providing an input/output (I/O) event notification and operable to support one or more applications. In the following examples, an event is considered to be a notification following the receipt or transmission of data over the network, however it will be appreciated that in some cases an event may include the receipt or transmission of data via a network interface or sub-system but not necessarily over a network, for example guest domains in a vitualised system may communicate with each other via the network interface or sub-system. The receipt of data may correspond to the receipt of a data packet, frame or segment at the network interface.

The data processing system 100 may be for example a server, personal computer, network switch, or other kind of computing device. A computing device may for example comprise one or more CPU cores, memory and set of I/O resources. It will be appreciated that a computing device may be for example integrated on a single chip.

FIG. 1 shows the data processing system 100 comprising at least one application 101 and an application programming interface (API) 102 supporting at least one socket 103, 104 associated with the application 101. The system 100 further comprises a sub-system 105 and physical hardware components 107. In some examples the physical hardware components 107 may be a network interface card (NIC) 107.

The sub-system 105 and physical hardware components 107 may for example together provide an interface between the network 110 and the application 101. While the physical components 107 may provide the physical hardware interface to the network 110, in some embodiments, the sub-system 105 may act as a network interface controller and may for example provide a protocol stack and functionality of a network driver. The sub-system 105 and physical components 107 may act as a network interface for the data processing system 100.

The sub-system 105 may act as an interface for communications between the application 101 and other applications or end-points over a network 110. The physical communication over the network 110 may be provided by a network interface card (NIC) 107.

The sub-system 105 may further include a file descriptor table 108 indicating a correspondence between a file descriptor and a resource (for example a socket) identified by the file descriptor. The sub-system 105 may comprise an event notification mechanism 109 which monitors events and informs the application when sockets associated with that application are ready to be processed. The event notification mechanism 109 may for example comprise one or more on which notifications corresponding to the placing of data on one or more socket queues may be placed. The sub-system 105 may further implement a network protocol stack 106 for the protocol processing of received data packets or frames.

The sub-system 105 may make use of buffers, pointers and file descriptors in order to provide data received at the NIC 107 to the relevant application 101.

In operation, an application such as application 101 wishing to receive network packets over the network may create a port to which network packets may be addressed. Packets addressed to the port number of the port and IP address of the host will be processed by the protocol stack within the sub-system 105 after being received at the NIC 107. The port may be bound to a socket which acts as a communication end-point. The socket may be provided with a socket queue which is a queue like data structure into which data for the socket may be placed in order that it may be accessed by an application, process or thread for which the socket is created.

When a packet arrives at the NIC 107, the NIC 107 copies the packet to a receive buffer in host memory. The receive buffer into which to place the packet may be identified for example by a receive data ring of the NIC 107. It will be appreciated that there may be several receive buffers into which the packet may be copied depending on the type of packet, address information contained within a header of the packet and/or the processing capabilities of the system. It will also be appreciated that there may be several receive buffers and the NIC 107 places the packet into the buffer identified by the receive data ring. The host buffer may be associated with an event queue that holds indications of NIC actions which have occured on the host buffers. For example when data is placed in the host buffer from the NIC 107, the NIC 107 may further place an event on the event queue associated with the host buffer.

In order to process the received packet, the sub-system 105 may determine whether the packet comprises valid address information. In one example, the sub-system 105 may for example look at the packet in the host buffer and determine if the packet comprises valid address information. In another example, the sub-system may determine whether the packet has valid address information from the event notification on the events queue associated with the host buffer.

If the packet does comprise valid address information, the sub-system 105 may perform the relevant protocol processing on a packet using the protocol stack 106. The packet may comprise a data segment for example payload data and a header. For example, a network packet (such as a Ethernet frame) may comprise a header and payload. The header contains address information (for example an internet protocol (IP) address) and other protocol information (for example a transport control protocol (TCP) sequence number).

On receipt of a packet over the network, the NIC 107 may place the entire packet in the host memory buffer. In some examples, the NIC 107 may also place other meta-data, for example the state of checksum offload processing and/or receive side scale hashing of the network packet, in the host memory buffer or associated event notification queue. The entire network packet and meta-data may be available to the protocol stack 106 for protocol processing.

The protocol stack 106 may protocol process the packet and any meta data to provide a data segment of the packet. In some example, the data segment may correspond to the payload data of the packet, however in some examples, (such as a 'raw' Ethernet socket) the entire data segment will comprise the network packet after protocol processing.

After protocol processing the sub-system 105 may then enqueue the data segment of the packet on a socket queue of a socket associated with the address of the packet. A socket queue may further be associated with an events queue for the socket. When a data segment is placed on a socket queue, a corresponding event may be placed on the events queue associated with that socket. The corresponding event may be for example a notification that data has been queued for the socket. In some embodiments, the events queue associated with a socket may be a queue in the events monitor associated with the file descriptor describing that socket.

When an application would like to know if an event has occurred on one or more sockets (for example if the sockets are ready to be processed by the application), the application may make a system call to the events monitor requesting a status of one or more file descriptors. The events monitor may determine the status of a file descriptor (socket) from an events queue associated with the socket and return this information to the application. The status may be for example that an event has occurred for that socket. The application may then make a system call to process the socket, for example to receive the available data from the socket queue.

It will be appreciated that in the foregoing the sub-system 105 has been described as providing an interface between the NIC 107 and an application 101. In some embodiments, the sub-system 105 may be provided by a kernel of a host system and in other embodiments the sub-system may be provided by a virtual interface. It will be appreciated that in some embodiments, the sub-system 105 may be provided by both kernel and virtual interfaces.

In the case where the sub-system is provided by the kernel, protocol processing of a data packet in the host buffer may be triggered by an interrupt from the NIC 107. After the NIC 107 has placed a received packet in the host memory buffer and delivered a notification event to an event queue associated with the host memory buffer, the NIC 107 may generate an interrupt for the kernel. On receipt of the interrupt, a host device driver (for example a NIC driver) may dequeue the packet from the host buffer and invoke the kernel's protocol stack. It will be appreciated that this interrupt initiates the processing of the packet in the host memory buffer in terms of determining whether the address information is valid and protocol processing as described above.

In the case where the sub-system is provided as a virtual interface, for example in at an user-level of a host processing system, the virtual interface may implement so-called 'lazy' protocol processing. In such a case, the protocol processing of a packet in the host memory buffer may be triggered by a system call made by an application and/or on the occurrence of a timeout. The system call may in this case be intercepted and handled at user space (for example in a library), and may be made in order to determine whether one or more sockets are ready to be processed. In a virtual interface there may be a plurality of host memory buffers, for example each associated with a file descriptor. The NIC 107 will place a received packet into an appropriate host memory buffer.

In response to a system call and/or timeout, the virtual interface may poll the event queues associated with one or more host memory buffers. Packets queued on the host memory buffers may be protocol processed in response to notification events on the associated event queues. Segments of the protocol processed packets may be placed on the socket queues to which the packets are addressed and event notifications may be placed on the event queues associated with the socket queues. It will be appreciated that the events queues associated with the sockets may form part of the events notification mechanism. If the protocol processing was triggered by a system call, the virtual interface may then return an indication of any events on the events queues of the filed descriptors (sockets) identified in the system call.

It will be appreciated that in a virtual interface, the occurrence of a timeout and/or system call initiates the processing of the packet in the host memory buffer in terms of determining whether the address information is valid and protocol processing as described above.

It will be appreciated that in the above cases, the protocol processing is being carried out by the sub-system 105. In some embodiments however, protocol processing may also be carried out at least partially at the NIC 107.

In order to process data received for a socket, an application needs to be made aware of a status of the socket, for example whether a socket is ready to be processed. The application 101 may be aware that a socket is available to be processed through use of a mechanism of managing file descriptors, in this case using system calls.

This mechanism may be a demultiplexing system call made by the application to determine whether data is available. The system call may include a set of file descriptor(s) identifying the socket(s) for which an application wishes to determine the state. The table 108 may store a correspondence between the file descriptor(s) and the resource(s) (for example the socket(s)) that file descriptor(s) describe. This allows the sockets for which the system call is being made to be identified by the sub-system 105. The sub-system 105 may reply to a system call indicating which sockets (identified by file descriptors) are ready to be processed.

One family of demultiplexing system calls includes the poll( ) and select( ) calls. For example, in the case of a connection orientated protocol such as TCP (transmission control protocol), a listening socket (or file descriptor) is indicated as ready for reading when a new incoming client connection request is received. A subsequent call to accept( ) would cause the creation of a new socket which is connected to the client and will enable data to be sent to the client, say using the send( )call or received from the client using say the recv( ) call. A subsequent call to poll( ) could include a file descriptor identifying this new connected socket as well as a file descriptor identifying the accepting socket. The response by the sub-system to the subsequent poll( ) call would indicate either available data on the connected socket or another new connection request on the accepting socket.

It can easily be seen that there can be many thousands of sockets—orders of magnitude more than processing cores available to the data processing system 100, and determining, for the threads available, the sockets which are ready for processing becomes more complex. In order to deal with the number of file descriptors a second family of stateful event based multiplexing operations epoll_ctl( ) and epoll_wait( ) may be available as part of the API 102. This family of demultiplexing system calls can determine the sockets which are ready from a pre-registered set of file descriptors. This is in contrast to the above example of having the set of file descriptors specified and scanned in each call to select( ) or poll( ).

In Linux for example, the select, poll and epoll mechanisms may be provided as part of the system call API, each of which allows a process to monitor sets of file descriptors for an event such as a file descriptor becoming ready to perform I/O, or data being updated at a memory location identified by the file descriptor. The sets of file descriptors that the application 101 wishes to monitor may be held in objects 108 that can be managed through the mechanisms provided by the API 102, with each object holding a set of file descriptors relating to the application. For example, in Linux, an application can establish an epoll instance for handling a set of file descriptors that the application wishes to monitor, the epoll instance being managed by means of epoll_create( ), epoll_ctl( ) and epoll_wait( ) system calls provided by the epoll mechanism.

With the use of the epoll mechanism, an application may make a set of epoll_ctl( ) system calls, each epoll_ctl( ) call being a request to add a file descriptor to the set of file descriptors handled by an epoll instance, to modify an event type monitored in relation to a file descriptor of the set, or to delete a descriptor of the set. Each epoll_ctl( ) call specifies at least one file descriptor to which it corresponds and identifies an event type that the epoll instance is to monitor for that file descriptor. It will be appreciated that epoll instances may be held at the event notification mechanism 109.

Once an application has configured a set of epoll descriptors, the application may make an epoll_wait( ) system call to cause its thread to block on the identified types of events of each of the set of descriptors. In some cases, the event may be such that the thread may immediately return a response to the epoll_wait( ) call. The response to the epoll_wait( ) call may indicate the sockets identified by the returned set of descriptors that are ready to be processed.

The epoll mechanism allows the sockets of interest to be added to a set through the system call epoll_ctl( ). A subsequent epoll_wait( ) system call will return batches of sockets which are ready to be processed, for example sockets for which data has been received. In some embodiments, the application may pass these sockets on to worker threads for the actual processing.

The data structures returned by the epoll_wait call is such that ready sockets are presented in a linear list for example an array. This linear list may not give any indication of an order in which the ready sockets should be processed.

Some applications however may benefit from receiving not only a list of sockets that are ready to be processed, but also an order in which the sockets (endpoints) should be serviced. For example applications matching trade requests at a financial exchange may depend on fairness to all participants and it would be beneficial if the network communications API (for example API 102) both scales to large numbers of endpoints and indicates the order by which the endpoints should be serviced. This order by which the endpoints should be serviced may represent the time at which the data or transactions were received at the physical network interface 107 to the data processing system (in this example, a financial server) from the network.

An approach to indicating a time at which the data was received at a network interface 107 of a data processing apparatus may be to first deliver the received packets via a for example single 'raw' socket to a single threaded application which time-stamps delivery (forming a transaction-id) and then forwards the packets or segments off to either further compute nodes, or other threads where protocol processing and a distributed algorithm matching based on this id can be used. However, this single threaded application may act as a bottleneck to the total transaction rate which can be handled by the entire distributed application and may also add to the time of flight latency of the processing chain. In this case, it would not be possible to process data in parallel on a multi-core computer. As electronic trading times have reduced and volumes increased, these restrictions may be problematic to the system.

Embodiments of the present application provide an application programming interface (API) 102 supporting a modified epoll_wait( ) call that may provide in return an indication of the sockets that are ready to be processed and an indication of an order in which the sockets are to be processed. In some embodiments of the present application, the API 102 may allow the application or originator of the system call to receive data from multiple sockets in the order in which the bytes were received at the network interface card 107.

Figure 2:
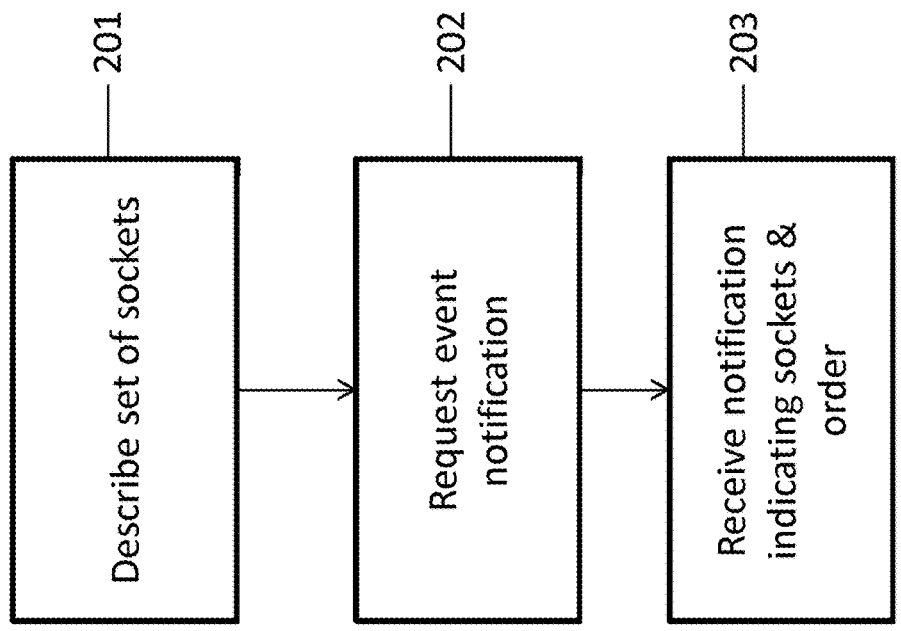
FIG. 2 is a flow diagram depicting the method steps associated with embodiments.

FIG. 2 is a flow diagram depicting the method steps carried out by an embodiment of the present application. It will be appreciated that the method may be carried out in accordance with system calls and responses supported by an API 102.

At step 201 of FIG. 2, an application 101 may describe a set of sockets which it would like the event notification mechanism 109 to monitor. The set of sockets may correspond to sockets from which the caller (in this case, the application 101) is interested in receiving data. In one embodiment, the set of sockets may be described using the standard epoll system calls, for example the epoll_create( ) and epoll_ctl( ) calls.

At step 202, the application may request that the event notification mechanism 109 monitors the described set of sockets. The application 101 may make a system call asking for an ordered indication of which sockets are ready to be processed in place of the standard epoll_wait( ) system call.

In this example, the new function is named onload_ordered_epoll_wait( ) however it will be appreciated that embodiments are not limited to this.

This function structure according to one example may be described as follows:

int onload_ordered_epoll_wait(int epfd, struct epoll_event *events,
    struct onload_ordered_epoll_event *oo_events,
    int maxevents, int timeout);

This function may cause the notification mechanism 109 to wait for events on the file descriptors identified by int epfd for a period of time specified by int timeout and return these events to the caller of the function (in this case the application). This may cause the sub-system 105 to poll for data queued at any of the identified ports.

The int maxevents specifies the maximum number of events that can be returned in response to the onload_ordered_epoll_wait( ) call. The structure epoll_events in memory is an events array pointed to by the *events pointer and contains the events that are being returned for the file descriptor(s) epfd. It will be appreciated that in this regard, the onload_ordered_epoll_wait( ) system call may be similar to the epoll_wait( ) system call.

The onload_ordered_epoll_wait( ) system call will also return a second array (oo_events array) pointed to by the pointer oo_events. This array may indicate an order in which the events in the memory structure pointed to by events are to be processed. The oo_events array length may match the events array length (max_events), and the entries of the two arrays may correspond, i.e. the nth entry in the oo_events array corresponds to the nth entry in the events array.

The structure of the oo_events array is as follows:

```
struct onload_ordered_epoll_event {
    struct timespec ts;
    int bytes;
}
```

The onload_ordered_epoll_event structure contains two fields. These two fields will be set in any entry in the oo_events array that corresponds to an entry in the events array that indicates a readable socket (socket ready to be processed).

The struct timespec ts indicates for an entry in the oo_events array the timestamp of the next byte(s) available to read on that socket. The socket will be identified by the correspondence to the events_array.

The int bytes indicates the number of bytes available to read (for the corresponding socket) that will preserve wire ordering. Some of these bytes may have a different time-stamp to that indicated by the ts field of the oo_events array (e.g. if multiple segments received consecutively on the same socket and were coalesced) and should the application need to know the timestamps of all bytes this can be obtained using the SO_TIMESTAMP/SO_TIMESTAMPING APIs when performing the corresponding recv( ) call.

Figure 3:
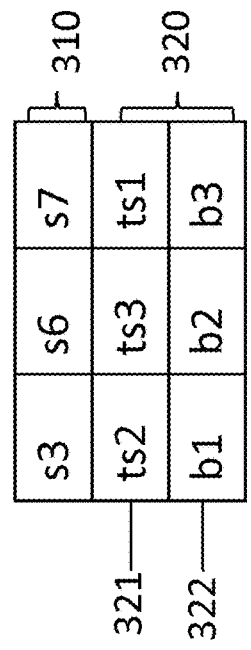
FIG. 3 is a conceptual diagram depicting an example of a data structure.

FIG. 3 shows an example of an events array and oo_events array in response to an onload_ordered_epoll_wait( ) call.

In FIG. 3, an events array 310 indicates the sockets (for example out of potential sockets S1 to S10) for which an event has occurred and an oo_events array 320 indicates an order in which the indicated sockets are to be processed. The events array 310 is an indication of the sockets for which an event has occurred and thus the sockets which may be processed by an application. In this example, it can be seen that events have occurred for the third, sixth and seventh sockets S3, S6 and S7. The onload_ordered_epoll_wait( ) call has thus returned events for the sockets S3, S6 and S7. The call may return the ready descriptors for those identified sockets. Additionally, the set of sockets (S1 to S10) may be previously identified as being the sockets to be monitored and the response to the call will return ready sockets from that identified set.

The onload_ordered_epoll_wait( ) call modifies the oo_events array 320 in the region of memory pointed to by the pointer oo_events. The oo_events array 320 comprises a time-stamp field 321 and a bytes field 322. The time-stamp entry for a socket indicates an order in which the socket is to be processed with earlier time-stamps being processed first in some examples. In some examples, the time-stamp indicates the time at which data was considered to be received at the NIC 107.

Alternatively the timestamp could be from some other network entity (such as a switch) or application. In some embodiments, the ordering may be determined by an ordering constraint that may not necessarily be the linear in time processing according to the time stamps. For example, the ordering constraints determining the order in which the sockets are to be processed may be weighted by business policy. In some example some users may have a higher priority over others depending on the level of service negotiated with a customer.

The bytes field 322 indicates the number of bytes enqueued on a socket to be processed for that socket in order to preserve the ordering of the sockets. The bytes field 322 is used to preserve the ordering when two or more events occur on a socket that are intervened by other events on other sockets.

Network protocols commonly used for transaction processing such as order entry are byte stream rather than datagram based and are resilient to out of order delivery and packet loss (through re-ordering and retransmission), such network protocols are for example financial information exchange (FIX) over transport control protocol (TCP). In contrast, datagram oriented network protocols such as user datagram protocol (UDP) over IP multicast are commonly used for example in market data reporting.

Thus with relevance to a byte stream oriented protocol, the bytes field aims to improve the fairness in the order in which bytes of the byte-stream are processed. For example, in some implementations, it would be considered unfair if a given order (for example an order sent to a financial server) N bytes long was delivered with the first (N-n) bytes speculatively transmitted by a participant, only completing the remaining n bytes when the order is ready to execute. In this case, the participant should not benefit from the speculative transmission (the order should not be treated as arriving sooner than all the bytes are available).

For example, the third socket S3 may receive a first number of bytes and then later a second number of bytes. In order to preserve ordering, only the first number of bytes are to be processed before processing another socket if the second number of bytes arrived later than bytes on the other socket. Without the bytes field, all available bytes for a socket may be processed and in this case, the first and second number of bytes may be processed before the bytes on the other socket are processed.

In the example of FIG. 3, it can be seen that three events have been returned—an event has occurred for the third socket S3 with an associated time-stamp ts2 and number of bytes b1, an event has occurred for the sixth socket S6 with an associated time-stamp ts3 and number of bytes b2 and an event has occurred for the seventh socket S7 with an associated time-stamp ts1 and number of bytes b3.

The time-stamps ts1, ts2 and ts3 are linear in time. Thus it can be seen that an event comprising the receipt of b3 bytes occurred on the seventh socket S7 first, then an event comprising the receipt of b1 bytes on the first socket S3 occurred and lastly an event comprising the receipt of b3 bytes on the sixth socket occurred. The response to the onload_ordered_epoll_wait( ) call provides an indication of the order in which the sockets are to be processed.

It will be appreciated that FIG. 3 is by way of conceptual example only. The arrays 310 and 320 may be of a different form and may comprise more and/or less information in other examples.

In the given embodiment, only one event per file descriptor is revealed, however it will be appreciated that in some embodiments, the API may be extended to include more than one event per file descriptor.

The onload_ordered_epoll_wait( ) call will return an I/O notification to the application. Once the application has received the I/O events notification it may retrieve the data at the sockets. In some embodiments, the API may be implemented as an extension to the standard epoll mechanism. The application may therefore use any of the standard socket receive calls to get the data delivered once it has been notified of the ordering, for example through use of the recv( ) call.

The ordering of the sockets to be processed may correspond to a time-stamp of the data enqueued at that socket. In some embodiments this may be a simple hardware time-stamp given to a packet when it is received at the NIC 107. However it will be appreciated that other factors may be taken into account when assigning a time-stamp to a packet. In other embodiments a time-stamp may be assigned to a packet based on the hardware time-stamp given to the packet on reception as well as other factors. These factors may be taken into account to determine a time at which the data is considered to be received. For example the data may not be considered to be received if it is not received in order or is not received validly.

It will also be appreciated that the timestamp may not accurately represent the order in which data was received at the NIC 107 in that it may take other factors into account to determine the ordering. The time-stamps may be considered to be an indication of the order in which the sockets are to be processed, the data itself may be associated with a different time-stamp that represents the time at which the data physically arrived at the NIC 107.

For example, data from two packets destined to a first socket (for example part of a first data stream) may be coalesced to be reported to the application as a single event having the time-stamp of the first packet of the two packets if there was no intervening event, for example the reception of any other packets destined to other sockets in the set (i.e. part of a different data stream). In this case, the coalesced data will be provided by indicating the number of bytes to include data from both packets and the timestamp of an event in the timestamp will correspond to the time of receipt of the first packet.

In a first example, segments A1 and A2 may form part of a first data stream destined to socket S1 and segments B1 and B2 are part of a second data stream destined to socket S2. It will be appreciated that each segment may form part of a respective network packet. If the order of receipt of the segments (for example as part of respective network packets) at the NIC 107 (on the wire) was as follows:

A1, A2, B1, B2

Then the segments A1 and A2 may be coalesced to form a data segment with a timestamp associated with segment A1 (for example, the time at which A1 was received). Similarly, the segments of B1 and B2 may be coalesced to form a data segment with a time-stamp associated with B1. This will cause the function onload_ordered_epoll_wait( ) to order the sockets S1 and S2 and to allow the application to process the coalesced data segment comprising the data segments A1 and A2 and then process the coalesced data segment comprising the data segments of B1 and B2, which preserves the order in which the packets were received.

It will be appreciated that on the receipt of each segment that is queued on a socket, an event queue associated with that socket may be updated to reflect the event of the segment being enqueued. In this embodiment, the function returns only one event per socket at a time. By coalescing the data segments of A1 and A2 into a single data segment representing a single event, the single event may be placed on the event queue associated with the socket and the coalesced segment may be processed.

It will be appreciated that the in a byte stream protocol, segments are queued together on a socket queue. By coalescing two or more segments, the segments are coalesced to be associated with a single event notification on the events queue associated with the socket queue. The events notification is indicative of how many bytes on the socket queue to process for an event. Coalescing the segments allows the segments to be processed as though they were a single event, for example as though they were received in one packet.

If the data segments A1 and A2 were not coalesced, the function would indicate the number of bytes of the data segment A1 in the bytes field for S1 and the number of bytes of the data segment B1 in the bytes field for S2 because the arrival of A2 and B2 would be considered to be second events for the sockets. The application would then process the bytes of the data segment A1 and then the bytes of the data segment B1 which in this example would be out of order.

It can also be seen from this example that with coalescing segments (and events), some packet segments, for example the data segment A2, may be allocated a timestamp in the response to the onload_ordered_epoll_wait( ) call that is different to the hardware time-stamp allocated to A2 (for example the hardware timestamp allocated to A2 when the packet carrying A2 is received at the NIC 107). In this example A2 is allocated the same timestamp as A1 even though the hardware timestamp of A2 would be later. If an application needs to know the hardware timestamp of all of the data segments in a coalesced data segment, this can be obtained using the SO_TIMESTAMP/SO_TIMESTAMPING APIs when the application performs the corresponding recv( ) call.

If the order of receipt of the segments (for example as part of respective network packets) at the NIC 107 (on the wire) was as follows:

A1, B1, A2, B2

Then the data segments A1 and A2; and B1 and B2 cannot be coalesced as there was an intervening event on another socket (receipt of B1) between the receipt of A1 and A2 on S1 and there was an intervening event on another socket (receipt of A2) between the receipt of B1 and B2 on S2. The function onload_ordered_epoll_wait( ) will return an order of the sockets S1 and S2 but only allow the application access to the data segment A1 for S1 and the data segment B1 for S2. In response to a second system call the function onload_ordered_epoll_wait( ) will return an order of S1 and S2 and allow the application to access the data segments A2 and B2 respectively, thus preserving the order of the packets.

It will be appreciated that in some embodiments a time-stamp may be assigned to a packet for example on arrival of the packet at the time-stamping hardware. The time stamp may be the timestamp for the data segment within the packet. When data segments are queued at a socket, they may be associated with the timestamp of a packet in which they arrived.

In a second example, the time-stamp assigned to a packet (and segment) may take into account the stream order of the packet. For example, the time-stamp may ensure that the packets are only considered received and assigned a time-stamp to be used in the ordering when the packet has been received in a sequence order of a packet stream. In this case, out of order (in terms of the data stream) packets will be retained until the packets preceding in the sequence are received.

For example, consider the first data stream comprising segments A1, A2, A3, A4 destined to the first socket and a second data stream B1, B2 destined to a second socket. If the order of the segments (for example in respective packets carrying the segments) received is:

| A1 | A2 | A4 | B1 | A3 | B2 |
|----|----|----|----|----|----|
| T1 | T2 | T3 | T4 | T5 | T6 | where T1 to T6 are the hardware time-stamps for the respective packets in which the data segments A1 to A4 and B1, B2 are received.

Then the data segments of packets A1 and A2 will be coalesced and given the time-stamp T1 as described above. A4 was received out of order and so is retained until A3 is received. B1 is thus the next in the order and is given timestamp T4. When A3 is received, the data segments A3 and A4 may be coalesced and given the timestamp T5. It will be appreciated that because A4 is received out of order, it is assigned time-stamp T5 (the time at which it becomes in-order on receipt of A3) rather than retaining its hard-ware time-stamp T3. B2 retains time-stamp T6.

Thus after being ordered, the segments have the following time-stamps:

| A1 | A2 | A4 | B1 | A3 | B2 |
|----|----|----|----|----|----|
| T1 | T1 | T5 | T4 | T5 | T6 |

And thus will be processed in the order: A1, A2, B1, A3, A4 and B2.

It can be seen that in the above example, the segments either retain their hardware time-stamps (in the case of A1, B1, A3 and B2) or are coalesced with another segment to take on its hardware time-stamp (for example A2 and A4).

It will also be appreciated that in some examples new time-stamps may be generated to preserve the order of the segments. These timestamps may only indicate order and not an actual time and the timestamp may be stored and represented more efficiently than the actual timestamp (for example may be smaller than a 64 bit hardware timestamp). For example instead of retaining the hardware time-stamp of A1, coalesced segments A1 and A2 may take on a generated time-stamp ts1, B1 may be generated a time-stamp ts2, A3 and A4 may be generated a time-stamp ts3 and B2 may be generated a time-stamp ts4.

As the function returns only one event per socket, the onload_ordered_epoll_wait( ) system call will return the socket order S1 and S2, with coalesced segment A1 and A2 accessible for S1 and segment B1 accessible for S2. A second call will return a socket order S1 and S2 with the coalesced segments A3 and A4 accessible for S1 and the segment B2 accessible for S2.

It will be appreciated that in some cases, an out of order packet may be caused by a packet being lost or taking a longer path over the network. In other cases, the packet may become corrupted and be dropped at the protocol processing stage at the kernel. The protocol stack may request a retransmission of that packet.

The bytes of a byte stream are ordered and provided to the application such that the application can process the bytes in the order in which they become readable. In other words, taking into account lost packets, corrupted packets and the retransmission of some packets as discussed. In some embodiments, the packet or segment is considered to be received when that packet or segment becomes readable.

Figure 4:
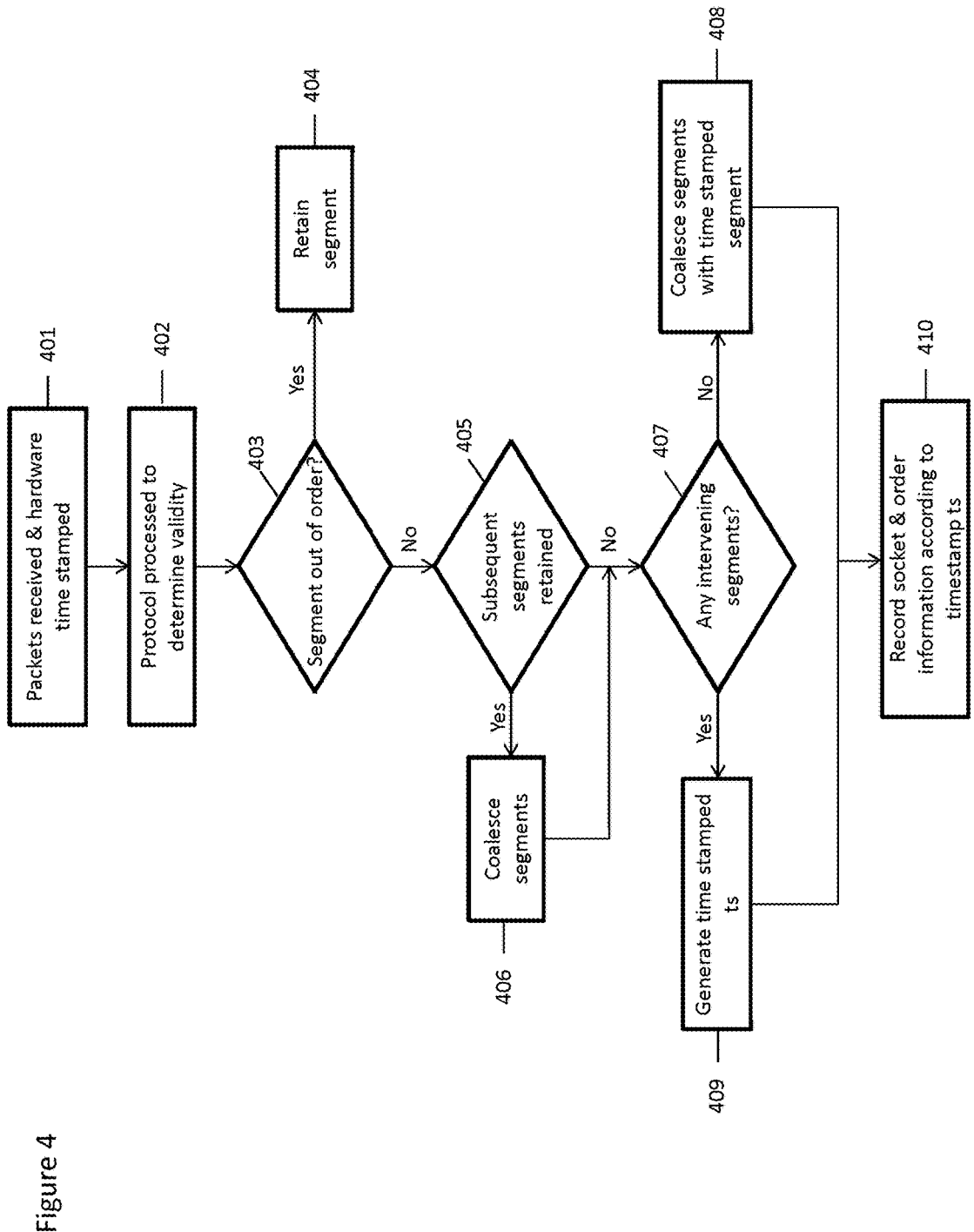
FIG. 4 is a flow diagram depicting the method steps associated with further embodiments.

FIG. 4 shows an example of a flow diagram of the method steps for ordering the bytes received on the data streams of a set of sockets according to the ordering requirements of one example. In this example, segments from a same data stream are coalesced if there are no intervening segments from other data streams, out of order segments are retained to place them back in order and only segments from uncorrupted packets are processed.

It will be appreciated that in other examples, other requirements and/or different combinations of the above requirement of order may be implemented.

At step 401 of FIG. 4, a packet comprising a segment is received at the NIC 107 and is hardware time stamped. The packet may be hardware time-stamped by the NIC 107. The packet may be written to a receive buffer and an event notification may be written to an event queue associated with the receive buffer.

At step 402 the packet may be protocol processed. It will be appreciated that in some embodiments, the packet may be protocol processed in response to a notification of the receipt of the packet. In other or additional embodiments, the packet may be processed according to an occurrence of a time out and/or a request from the application for the status of a socket to which the packet is addressed.

In the protocol processing at step 402, the packet may be checked to see if control information for the packet is valid, for example it may be checked that an address of the packet is valid, protocol headers of the packet is valid and/or a digest of the protocol headers is as expected. It may also be checked that checksum values (for example from checksum hardware) are valid. In some examples at step 402, it may be determined whether retransmission of the packet should be requested and the packet may be discarded or kept.

If the control information is valid for the packet, the relationship of the segment of that packet in relation to the data stream to which the segment belongs may be considered. At step 403 it is determined whether the segment has been received out of order. A segment may be considered to be out of order if it does not correspond to the next segment in the sequence of segments of the data stream to which it belongs. If the segment is out of order, then that segment is retained at step 404. In some examples, the segment may be retained by the protocol stack. It will be appreciated that in some examples, the protocol stack will retain the packet in which the segment is received.

If the segment is not out of order, it is determined at step 405, whether there are any segments being retained that are next in sequence to the received segment. This step determines whether any out of order segments or packets have been received and are being retained for that data stream. If the next sequential segment is being retained, the received segment and the next sequential segment may be coalesced into a single segment at step 406.

After step 406 and also if no subsequent segments are being retained at step 405, the method proceeds to step 407 where it is determined if segments belonging to other data streams have been received between the receipt of a previous segment (enqueued on the socket) of the data stream and the currently received segment of the data stream.

If no intervening segments were received, the method proceeds to step 408, where the received segment is coalesced with any previously received segments in the socket queue. The coalesced segments will take the generated time stamp given to the previously enqueued segment in the stream. In other words, the coalesced segments will take the time-stamp of the segment(s) forming part of the coalesced segment that is already enqueued on the socket queue.

If intervening segments have been received, the method proceeds to step 409 where a time stamp is generated for the segment. In some examples, the generated time-stamp may be the time at which step 409 takes place. In other examples the generated time stamp may correspond to the hardware timestamp of the segment next in sequence of the data stream. It will be appreciated that in some embodiments, the timestamp may correspond to a time at which a packet comprising the segment is considered to be received. The time at which a packet is considered to be received may be an implementation choice, for example the time may be considered to be the time at which the segment reaches step 409 of FIG. 4, or for example may be considered to be the hardware time-stamp of the packet next in sequence in the data stream.

From steps 408 and 409, the method proceeds to step 410, where the generated timestamp information is used to provide an indication of an order in which events (enqueued segments) on the socket(s) are to be processed.

The events/oo_events array returned with the onload_ordered_epoll_wait( ) may be ordered such that if the calling application processes them in the given order the bytes will be delivered in the order they were received on the wire.

In the foregoing it has been described that the onload_ordered_epoll_call( ) identifies only one segment of data enqueued on a socket per call. For example if two segments having two different time stamps were enqueued on a socket, two calls would be required to return all the data enqueued on the socket. It will however be appreciated that in some embodiments, the call may return all the data enqueued for a socket.

In this case, in addition to returning an identity for the socket for which one or more events have occurred, the call will return the number of bytes in a segment and a time-stamp associated with that number of bytes for each segment enqueued on the socket. For example, the call may return a first number or bytes and associated timestamp and a second number of bytes and associated timestamp for a socket having two segments enqueued on it. The order in which each segment is to be processed may be given by the time-stamp. It will be appreciated that when a segment is enqueued on a socket, that segment may be a coalesced segment.

In a specific example, socket A may receive three segments, (A1, A2, A3), and socket B three segments (B1, B2, B3), but due to loss and retransmission of A2 they are seen on the wire at the receiver as:

| Hardware timestamp | t1 | t2 | t3 | t4 | t5 | t6 | t7 |
|---|---|---|---|---|---|---|---|
| Segment | A1 | A3 | B1 | B2 | B3 | A2 | D1 |

In this example the API may be implemented as the OpenOnload library. OpenOnload is a high performance network stack that comprises a user-level library. It will however be appreciated that this is by way of example only and other libraries may be implemented.

Onload will reorder the byte stream to return A1 A2 A3 in the correct order, but as A2 was received later, onload_ordered_epoll_wait( ) should indicate the following ordering: A1, B1-B3, A2-A3, D1

The function will return a single event per readable socket. If there are multiple blocks of data available on a single socket (as in the example above for socket A), the caller will need to call onload_ordered_epoll_wait( ) multiple times to discover them all: for example the first call above returns A1, B1-B3; second call returns A2-A3, D1. Onload may however coalesce multiple segments on a single socket (as above, B1-B3, and A2-A3) into a single event if there are no other sockets with a timestamp that interleaves.

Thus in this example, the timestamps generated by the flow diagram of FIG. 4 for the segments will be as follows:

| Hardware timestamp | t1 | t2 | t3 | t4 | t5 | t6 | t7 |
|---|---|---|---|---|---|---|---|
| Segment | A1 | A3 | B1 | B2 | B3 | A2 | D1 |
| Generated timestamps | ts1 | ts3 | ts2 | ts2 | ts2 | ts3 | ts4 |

It will be appreciated that in some embodiments, the onload_ordered_epoll_wait( ) may only be implemented for sockets that have hardware timestamps available. Data from other sources may be returned by the epoll_wait( ) call but without ordering information.

It will also be appreciated that while FIG. 4 provides some examples of the ordering of the bytes received on the data streams, this is by way of example only and other ordering may be implemented. For example in some applications processing the most recently received data first may be advantageous. In other examples, the API could also be used to ensure fairness between the processing of file descriptors, or other application defined schedules, for example 'arrival time within a number of priority weighted sets.

In some data processing systems, the network transport protocol may support user datagram protocol (UDP). In this case data must be delivered as a whole datagram. In the case where data received is in the form of UDP fragments, a decision can be made whether to provide a whole datagram (once received) with the timestamp of a first fragment of the datagram or a last fragment of a datagram. The decision may form part of a policy decision for the network and/or data processing device.

The API stamps with the time from the highest resolution clock available. Preferably this is a hardware timestamp unit on a NIC 107 which captures the time of each Rx and Tx frame. More usefully, the unit will be network synchronized according to IEEE 1588v2 or some other suitable time protocol.

In the foregoing so-called 'lazy' protocol processing has been discussed for a virtual interface. In this case, a received data packet is placed on a receive buffer (in the host memory) by the NIC 107 and an events queue associated with the receive buffer is updated to indicate an event (the queuing of the packet) has occurred on the received buffer. In some examples the receive buffer may be associated with a network (for example Ethernet) port.

When an application makes a system call asking for the status of one or more sockets, the virtual interface (subsystem 105) will poll any events buffers associated with the receive buffers that correspond to the identified one or more sockets. When an event is found, the associated packet is dequeued from the receive buffer and protocol processed for a data segment of that packet to be placed in a socket queue.

In some embodiments, the events queues associated with the receive buffers are polled in response to the onload_ordered_epoll_wait( ) call In the following, we refer to the receive buffer and the associated events queue as a virtual network port. In embodiments, the sub-system may comprise a plurality of virtual network ports, each associated with a data stream and/or socket or end-point. The ports may be queue-like data structures in memory.

It will be appreciated that the ports may not be polled simultaneously in response to a call from the application and/or timeout occurrence. As such care should be taken when performing ordering across two or more ports.

For example, in the case where the events monitor 109 monitors a first file descriptor associated with a first port and a second file descriptor associated with a second port, the onload_ordered_epoll_events( ) call may be used to determine if any events have occurred on the two ports and trigger the protocol processing of any such events. In order to determine if events have occurred, the sub-system 105 may poll the first port and then poll the second port before responding to the call.

Say for example packets PA1, PA2, PA3, PB1 and PB2 are enqueued on the first and second ports as follows:

| Port 1 | PA1 | PA2 | X  | PA3 | —   | —  |
|--------|-----|-----|----|-----|-----|----|
| Port 2 | —   | PB1 | —  | —   | PB2 | X  |
| time   | t1  | t2  | t3 | t4  | t5  | t6 |

Where 'X' is the point in time at which the port is polled.

The order of the receipt of the packets (and hence the segments within the packets) is: PA1 PA2 PB1 PA3 PB2 however PA3 was not available at the point that port 1 was polled. Hence in response to the polling, it will look like PB2 arrived before PA3 as PB2 was available on port 2 due to it being polled after port 1. Such a poll will return PA1 PA2 PB1 PB2 and not PA3. This would allow the segment of PB2 to be processed before the segment of PA3 as PA3 was not returned in the poll. In an embodiment of the present application, when the function onload_ordered_epoll_wait( ) is called, each port is polled. For the set of ports that returned data when polled, the timestamps of the last (or latest) packets received on each port are compared and the minimum (or earliest) time-stamp is stored. Only data segments up to this minimum timestamp are considered when returning results to the caller. Additional calls to onload_ordered_epoll_wait( ) may be required to discover the segments that were not considered.

In accordance with the above example, when the function onload_ordered_epoll_wait( ) is called, the first port is polled at t3 and the second port is polled at t6. The last packet received for the first port before it was polled is PA2 at t2. The last packet received for the second port before it was polled is PB2 at t5. The timestamp of PA2 is earlier than the timestamp of PB2 and so t2 is considered to be the minimum (or earliest) timestamp. Thus all packets received on the second port after t2 are not considered in the response to system call. In this case, PB3 is disregarded.

The packets may then be protocol processed in response to the system call and segments of the packets may be enqueued on the relevant sockets. In one embodiment, because PB3 is after the minimum time-stamp, it is disregarded and not returned as an event to be protocol processed. In another embodiment PB3 may be protocol processed, but is disregarded by the events monitor 109 when returning the events on the sockets and order in which the events are to be processed.

In the foregoing, data received at a single NIC 107 is reordered according to the onload_ordered_epoll_wait( ) call, however it will be appreciated that in some embodiments, data (for example data frames) received by two or more NICs 107 may be reordered. This may be of interest in applications having multiple network interface cards. For example, in some systems, data may be duplicated and transmitted down multiple redundant network segments.

Embodiments are applicable to the case where the data processing system 100 comprises more than one NIC 107. In the case where the two or more NICs are part of the same sub-system 105 and share a protocol stack 106, the two or more NICs 107 will be implemented with synchronized hardware clocks, for, in order to preserve the integrity of the hardware time-stamp.

The foregoing has described the system comprising a sub-system. The sub-system 105 may comprise a network interface controller 105 and a physical component "PHY" 107. The network interface controller 105 may typically perform one or more of the following: form data packets for transmission over the network, control the data flows passing through the device and co-ordinate the transfer of data between the data processing system and the network interface device 105. The PHY or NIC 107 may facilitate the physical transfer of data over the network 110 including the signaling of data over the network at the physical level of the network specification, for example the Ethernet specification.

The network interface 105 may include the functionality of a protocol stack and a network driver. It will however be appreciated that the implementation of the sub-system 105 may differ in embodiments. For example in one implementation, the protocol stack and network driver of the sub-system 105 may be resident in a kernel of the data processing system 100. In another example, the sub-system may be implemented as a virtual interface according to the virtual interface architecture (VIA) standard or Infiniband standard. In another example, the data processing system may have a plurality of network interfaces implemented as either part of the kernel or as a virtual interface.

Figure 5:
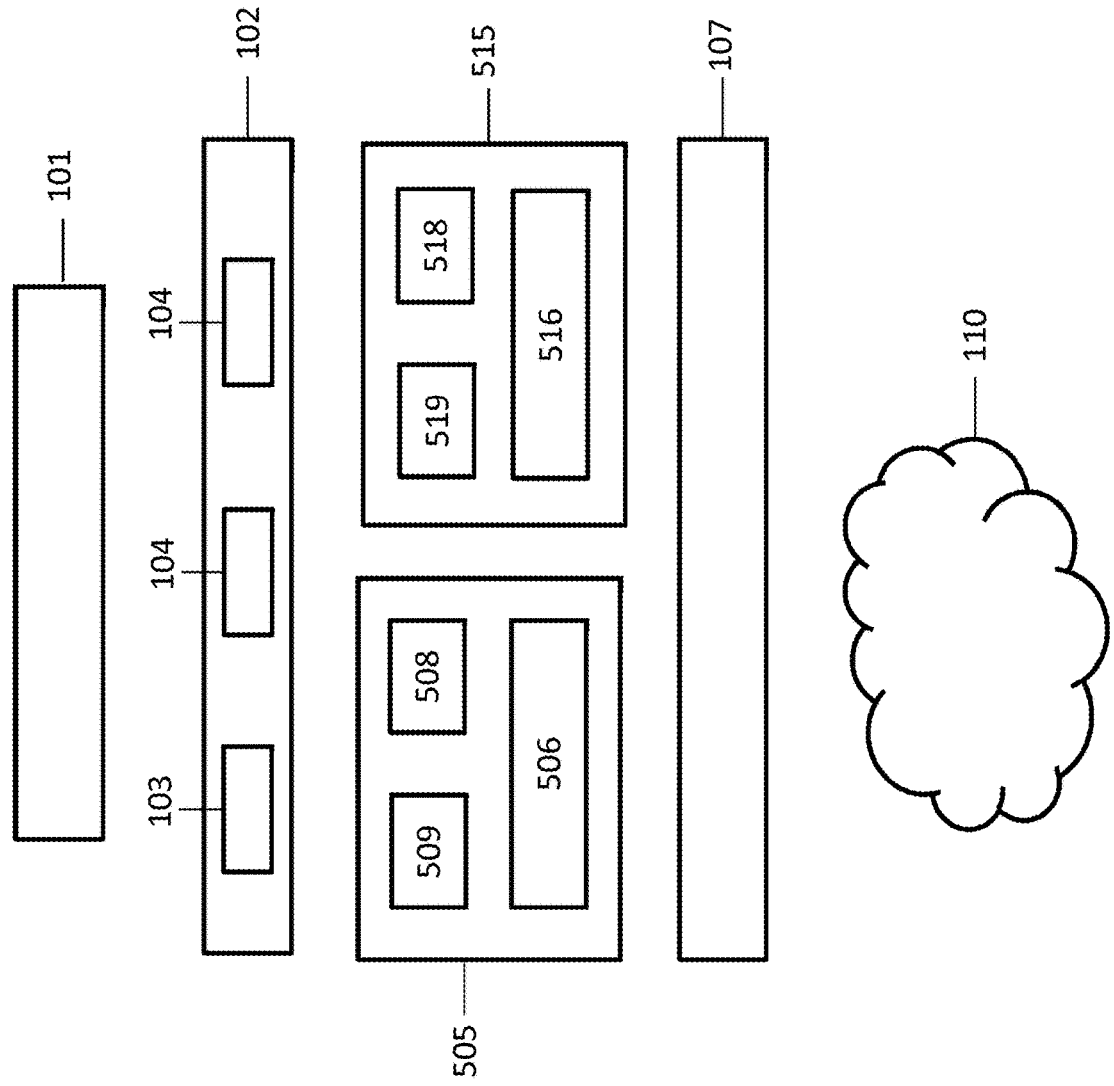
FIG. 5 is a further example of a data processing system in which embodiments may be implemented.

FIG. 5 shows an example of a data processing system that comprises a sub-system 505 implemented by a kernel of an operating system and a virtual sub-system 515 implemented at a user level of the data processing system 100. It will be appreciated that where the foregoing refers to a sub-system, this sub-system may be implemented as either part of a kernel or as a virtual interface or the data processing system may comprise at least one of each.

FIG. 5 shows an application 101, API 102, sockets 103, 104, network interface card (NIC) 107 and network 110. It will be appreciated that in these aspects, the data processing system of FIG. 5 may be similar to that of FIG. 1 and like reference numerals indicate like features.

The data processing system of FIG. 5 may further comprise a sub-system 505 resident in a kernel of the data processing system. The kernel sub-system 505 may comprise a protocol stack 506, event monitor 509 and file descriptor table 508. It will be appreciated that the protocol stack 506, event monitor 509 and file descriptor table 508 may be provided by or supported at the kernel.

The data processing system of FIG. 5 may additionally include a second sub-system 515. The second sub-system 515 may be a virtual interface provided at a user level of operation of the data processing system. The virtual interface 515 may comprise a protocol stack 516, event monitor 519 and file descriptor table 518. In some embodiments, the file descriptor table may be a copy of file descriptor table 508 however in some cases, the virtual interface 515 may maintain its own file descriptor table 518.

In the case of the virtual interface 515, the protocol stack 516 is a user level protocol stack 516. The virtual interface 515 may additionally include a kernel agent in some cases. In the data processing system, each application 101 at the user level may be given control of a virtual interface. For the reception of data, the virtual interface 515 may maintain a queue like data-structure for the receipt of data received over a network and associated with a socket.

In operation for the receipt of data via the virtual interface 515, the application may create a descriptor which points to a free receive buffer and place the descriptor in the receive queue of the NIC 107. When the NIC 107 receives a packet, it may retrieve a descriptor from the receive queue and then transfer the received data to the free receive buffer identified by the descriptor. The virtual interface may also update an events queue for the receive buffer. The virtual interface 515 will then process the data and enqueue the data on the queue like data structure associated with the relevent socket and with the virtual interface 515.

It will be appreciated that the API 102 provides an interface between the application and the virtual interface 505 and/or virtual interface 515. The epoll extensions are implemented in the API 102 and so the onload_ordered_epoll_wait( ) function will function regardless of whether the sub-system is implemented in the kernel or is a virtual interface. In this example, the API may be OpenOnload library and the onload_ordered_epoll_wait( ) function is implemented as an extension to the OpenOnload library. It will be appreciated that the API can thus cope with mixed file-descriptors belonging to either/or the kernel stack and user-space. The extensions may cover both kernel and user-space processing.

In some systems however, timestamp information may not be available in some cases. For example, the I/O event management mechanism may be resident in the kernel and the kernel may just be made aware of sockets for which the virtual interface 515 is enqueueing data. In some embodiment, the ordered reporting of events in response to an epoll call are only implemented in the kernel, in which case the algorithm would be added to the existing epoll code. It will be appreciated that the kernel-protocol stack 506 may be aware only of its sockets whereas the protocol stack 516 supported by the OpenOnload library may be aware of its sockets and the kernel stack's 506 sockets.

It will be appreciated that embodiments may be applicable to monitoring file descriptors (sockets) that are associated with different protocol stacks. For example a socket associated with the protocol stack 516 and a socket associated with the protocol stack 506 may be monitored by the same call. In this case, the call may be supported by the API 102 which may be aware of descriptors for both the kernel 505 and the virtual interface 515. It will also be appreciated the descriptors from multiple virtual interfaces may be monitored. In these cases, the timestamps may be globally valid. The API may access the ready descriptors from each stack in order to form the ordered set. The semantics of the multiplexor (epoll) may in these cases not preclude creating a set of file descriptors containing descriptors (sockets) from multiple stacks. OpenOnload is an example of an implementation where there is no such restriction.

In the foregoing reference has been made to an events queue associated with a socket queue and an events queue associated with a receive or host memory buffer. It will be appreciated that an event queue is configured to hold an event corresponding to an action carried out with a queue associated with the events queue. For example, for an events queue associated with the socket queue, an event can be considered an action such as the queuing of a segment on the socket queue. For an events queue associated with a receive buffer, an event can be considered an event associated with an action on the receive buffer. An events queue may hold a notification of such an event occurring. While the term events queue has been used in relation to the notification mechanism associated with the socket queue, it will be appreciated that such a notification mechanism may be any data structure that may hold information relating to an action carried out in relation to the socket queue.

The data processing system may comprise one or more processors and a memory and may be attached to the network by means of a peripheral network interface device NIC 107. The one or more processors may be running an operating system which may be any operating system that provides an I/O event notification mechanism configurable by user-level applications by means of a system call. For example, the operating system could be Linux, FreeBSD, Solaris or Windows.

The above description has introduced new API calls. It is possible also to express the new API using existing calls but overloading the semantics. For example: management of the file descriptors could be done using the existing epoll control interface, but then the application calls recvmsg( ) rather than epoll_wait( ), passing the epoll file descriptor. This call could be defined to return a data-structure which encodes the next block of data available from the epoll set of sockets, indicating which socket it was from. It will be seen that such an implementation is semantically equivalent to that described.

In some embodiments, the API may be a Portable Operating System Interface (POSIX) sockets API. The API may provide modified epoll calls. The API may support Berkeley Software Distribution (BSD) sockets. It will however be appreciated that embodiments may be provided by any suitable API, supporting epoll calls or equivalent.

In the foregoing reference has been made to applications. In some embodiments, application 101 may be a user level application operating in a user level of the data processing system. In other embodiments the application may be contained within the operating system.

In the foregoing reference has been made to systems calls. It will be appreciated that such system calls may be made to a kernel, for example a kernel 505 and/or to a virtual interface, for example, the virtual interface 515. In this case it will be appreciated that the system call may refer to an application programming interface library call which may be made to the kernel and/or virtual interface. The system call may be a system call made to a kernel and intercepted to be sent to a virtual interface when the relevant descriptors are being managed by the virtual interface protocol stack. In this case, the system call may be an intercepted system call.

The text has discussed providing an order in which sockets become readable. It will be apparent that the same interface can be used to inform an application as to the order by which a set of sockets become writable. This could for example be used to ensure fairness between a number of sockets to which data is to be delivered and where each socket is normally not-writable (for example because the connection traverses a slow link).

The invention claimed is:
1. A data processing system comprising:
one or more processors; and
at least one memory storing machine readable code executable by at least one of the one or more processors that, when executed by the at least one of the one or more processors, cause the at least one of the one or more processors to carry out a method comprising:

making data available to an application associated with a plurality of sockets by enqueuing the data on queues of the plurality of sockets; and providing to the application, in response to a request from the application:

an indication of events that have occurred on two or more of the plurality of sockets; and an indication of an order in which the two or more of the plurality of sockets should be processed so as to deliver the data enqueued on the queues of the two or more sockets to the application.

2. The data processing system of claim 1, wherein the indicated events are each associated with one of the plurality of sockets.

3. The data processing system of claim 2, wherein the indication of an order in which the events should be processed comprises for each socket associated with a respective event:

a number of bytes associated with the respective event; and a timestamp associated with the number of bytes.

4. The data processing system of claim 3, wherein the number of bytes associated with the respective event correspond to a data segment queued on a socket.

5. The data processing system of claim 4, wherein the timestamp of each socket indicates an order in which the sockets are to be processed.

6. The data processing system of claim 1, wherein each of the plurality of sockets is associated with a respective queue for queuing data received for said socket.

7. The data processing system of claim 1, wherein the request from the application identifies the two or more of the plurality of sockets.

8. The data processing system of claim 7, wherein the method further comprises monitoring the receipt of data segments for the identified sockets.

9. The data processing system of claim 8, wherein the method further comprises determining a timestamp to be associated with a data segment received for a socket.

10. The data processing system of claim 8 further configured to provide an application programming interface configured to support the sockets and one or more system calls.

11. The data processing system of claim 10, wherein in response to the request by the application, the application programming interface constructs a data structure comprising for each requested socket, a number of bytes field and a timestamp field.

12. The data processing system of claim 11, wherein the method further comprises completing the number of bytes field and timestamp field for the identified sockets which are ready to be processed.

13. The data processing system of claim 12, wherein the method further comprises providing an I/O notification to the application when the relevant fields have been completed.

14. The data processing system of claim 1, further comprising:

a physical network interface; and a host system comprising the one or more processors and the at least one memory.

15. The data processing system of claim 14, wherein the physical network interface is configured to hardware time stamp a data segment received for a socket before providing the hardware time stamp and the data segment to the host system.

16. The data processing system of claim 15, wherein the method further comprises determining a time stamp to be associated with the received data segment in dependence on the hardware time stamp.

17. The data processing system of claim 1, wherein the request from the application is a system call.

18. The data processing system of claim 1, wherein the response to the request comprises a system call response.

19. The data processing system of claim 1, wherein the two or more sockets are associated with at least one of: a process of the application and a thread of the application.

20. The data processing system of claim 1, wherein each of the two or more sockets is identified by a file descriptor.

21. The data processing system of claim 1, wherein the request from the application comprises one or more file descriptors identifying the sockets for which events are requested to be monitored.

22. The data processing system of claim 1 further configured to support a file descriptor table storing a correspondence between a file descriptor and a socket.

23. A non-transitory computer readable media encoded with instructions which when executed on one or more processors of a data processing system are arranged to provide an interface for supporting a plurality of sockets and a system call, the interface configured to:

receive a request from an application running on said one or more processors identifying two or more sockets of the plurality of sockets, wherein said request is for monitoring events on the two or more identified sockets;

provide, in response to the request from the application, a data structure accessible to a sub-system comprising an events field for indication that an event has occurred on one of the identified sockets and an order field for an indication of an order in which two or more of the identified sockets are to be processed so as to deliver data enqueued on queues of the two or more identified sockets to the application; and provide the request and indication of the data structure to the sub-system.

24. A method implemented in a data processing system comprising:

receiving a request from an application associated with a plurality of sockets of the data processing system; and providing to the application, in response to the request, an indication that events that have occurred on two or more sockets of the plurality of sockets and an indication of an order in which the two or more sockets should be processed so as to deliver data enqueued on the two or more sockets to the application.

25. A method implemented in a data processing system comprising one or more processors, the method comprising:

supporting a plurality of sockets and a system call;

receiving a request from an application running on said one or more processors identifying two or more sockets of the plurality of sockets, wherein said request is for monitoring events on the two or more identified sockets of the plurality of sockets; and in response to the request:

providing, in response to the request from the application, a data structure accessible to a sub-system comprising an events field for indication that an event has occurred on one of the identified sockets and an order field for an indication of an order in which two or more of the identified sockets are to be processed so as to deliver data enqueued on queues of the two or more identified sockets to the application; and providing the request and indication of the data structure to the sub-system.

26. A non-transitory computer readable media encoded with instructions which when executed on one or more processors of a data processing system are arranged to perform a method comprising:

receiving a request from an application associated with a plurality of sockets of the data processing system; and providing to the application, in response to the request, an indication that events that have occurred on two or more of the plurality of sockets and an indication of an order in which the two or more sockets should be processed so as to deliver data enqueued on queues of the two or more sockets to the application.

27. A data processing system comprising one or more processors and at least one memory storing machine readable code executable by at least one of the one or more processors to provide an interface for supporting a plurality of sockets and a system call, the interface configured to:

receive a request from an application running on said one or more processors identifying two or more sockets of the plurality of sockets, wherein said request is for monitoring events on the two or more identified sockets;

provide, in response to the request from the application, a data structure accessible to a sub-system comprising an events field for indication that an event has occurred on one of the identified sockets and an order field for an indication of an order in which two or more of the identified sockets are to be processed so as to deliver data enqueued on queues of the two or more identified sockets; and provide the request and indication of the data structure to the sub-system.

* * * * *